Patented Nov. 5, 1940

2,220,525

UNITED STATES PATENT OFFICE 2,220,525

MULTIPLY FABRIC ARTICLE

Toivo A. Kauppi and Russell R. Bradshaw, Midland, Mich., assignors to The Dow Chemical Company, Midland, Mich., a corporation of Michigan No Drawing. Application May 19, 1938,
Serial No. 208,837

4 Claims. (Cl. 154—46)

This invention relates to adhesives and especially to thermoplastic adhesives which are particularly adapted for use in producing laminated textile articles and the like. It relates particularly to such an adhesive as is resistant to attack by alkalies, soaps, and detergents.

In the manufacture of collars, cuffs, stiff bosom shirts, dickeys, or similar multiply articles, it is desired to unite the various plies with a continuous layer of adhesive which is resistant to the effects of alkalies, soaps, and detergents employed in laundering, and which will make the finished article wrinkle-proof and semi-stiff, said articles being more resistant to fraying incidental to wear than are the usual starched collars, cuffs, and bosoms, or the customary soft or informal shirts. Three requisites for thermoplastic adhesives to be employed for the above purposes are: (1) Adhesive material, when heat-softened, must form a strong bond with a layer of cloth pressed upon it; (2) the bond must be strongly resistant to disruption by the action of detergents or alkalies, even after about ten commercial launderings; and (3) the bonding material must not discolor under the action of washing soda or soap solutions during laundering and must not brown when ironed. Other desired properties are that the laminated fabric be readily flexible at all temperatures, not too stiff, and that the bond be substantially permanent. In the case of "fused" or starchless multiply collars, satisfactory permanence is indicated when the collar shows no change in appearance or physical condition after from 10 to 20 consecutive launderings and ironings.

Various expedients have been resorted to in an attempt to obtain multiply articles having the aforesaid desired characteristics. Among the procedures described in the prior art may be mentioned the use of synthetic resinous material as an adhesive for the present purpose. The resins so employed include, among others, polymeric forms of vinyl compounds, polymers of the esters of acrylic and methacrylic acids, and the like. Other processes of preparing the multiply textile articles include employment, as an interliner and adhesive layer of a textile sheet made in whole or in part of thermoplastic organic derivatives of cellulose, particularly cellulose acetate. The adhesives employed in the prior art are subject to a number of disadvantages. The polymeric vinyl compounds and acrylic acid esters are not in themselves sufficiently flexible to provide the desired properties in multiply fabric articles such as collars and the like. Their adhesive characteristics are also deficient in that after a moderate period of intermittent wear and laundering, collars or cuffs containing such materials as adhesives tend to fray, the outer cloth layer separating from the interliner containing the adhesive.

It is, accordingly, an object of the present invention to provide a thermoplastic adhesive for use in uniting layers of fabric as, for example, in the preparation of starchless or "fused" collars and the like, which will provide a strong bond resistant to disruption by the action of alkalies and detergents, and which will not discolor under the action of soap solutions during laundering, and will not brown when ironed. Other objects will become apparent from the following specification.

We have now found that thermoplastic adhesives possessing the foregoing and related desirable characteristics to an extent greater than that possessed by the adhesives described in the prior art may be prepared from a cellulose alkyl ether composition comprising a resinous mixed polymer of the lower alkyl esters of acrylic acid with the lower alkyl esters, and particularly the ethyl ester of methacrylic acid, and a plasticizer. Polymeric alkyl acrylates, such as methyl acrylate may be used instead of the co-polymers, although the latter are considered superior for the purpose.

The cellulose ethers which we employ in our adhesive composition are the water-insoluble lower alkyl ethers of cellulose containing at least two alkoxyl groups per anhydro-glucose residue in the molecule. We prefer to employ those cellulose ethers which dissolve readily in a solvent consisting of 80 parts of toluene and 20 parts of ethanol, by volume, and especially such cellulose ethers which have a relatively high intrinsic viscosity. The lower viscosity limit for ethers to be employed in the herein-described compositions is about 50 centipoises, the determination being made at 25° C. on a 5 per cent solution of cellulose ether in the aforesaid toluene-ethanol mixture. The upper viscosity limit is approximately 200 centipoises, determined in a similar solution. In particular, we prefer to employ ethyl cellulose having an ethoxyl content in the range from about 45 to about 50 per cent and having a viscosity of from about 75 to about 150 centipoises. In general, the preferred degree of substitution in a cellulose ether for use in our compositions, is that degree which gives the greatest solubility coupled with a low fusion point. Ethyl cellulose having an ethoxyl content of about 47.5 per cent has the lowest fusion point of any ethyl cellulose, and the 48-49 per cent ethoxyl material has the most general solubility in organic solvents.

The resinous polymers of the lower alkyl esters of acrylic acid and their co-polymers with the lower alkyl esters of methacrylic acid serve to provide adhesion between the cellulose ether in our composition and the fabric to which the adhesive is applied. Such co-polymers, like the alkyl ethers of cellulose, are resistant to attack by alkalies and detergents, are odorless, tasteless, non-toxic, and are not discolored by light or by heat to which they would be subjected during laundering or ironing operations. Without a polymer of this type, the cellulose ether adhesive composition might be made to adhere to fabric through several launderings, but the coated fabric is too stiff for the present purpose. Plasticized cellulose ethers may be applied to collar interliner fabrics, and will produce an article which has proper softness and flexibility, but most plasticizers do not have the required combination of alkali-resistance and adhesive properties, and the interliner will not stick to other fabric through laundering operations. Without the cellulose ether, the acrylate resin bond is not strong enough to resist laundering and flexing, and the textile tends to separate from the adhesive, especially along lines of folding. In our compositions, the acrylate resins contribute both alkali-resistance and adhesion to the cellulose ether-plasticizer combination, and provides a somewhat stiffer composition than plasticized cellulose ether, but which is still not as stiff as the cellulose ether alone. If the adhesive employed in a collar interliner is too stiff, the collar, which is usually sewn together along three edges with the inside out, cannot be involuted to put the various fabric layers in their final position without considerable difficulty. Of the various mixed polymers of the type described, we prefer to employ one containing about 2 molecular proportions (3 parts by weight) of ethyl methacrylate for each mole (1 part by weight) of methyl acrylate. Other proportions of ethyl methacrylate and methyl acrylate also provide satisfactory resinous materials for use in our compositions. For example, we may use a polymer product containing about one mole of ethyl methacrylate for each two moles of methyl acrylate. Such co-polymers are described in U. S. Patent No. 2,114,233.

The plasticizers which we may employ in our composition are any plasticizers which, when incorporated in the herein described compositions, are resistant to chemical attack and discoloration by detergents. We have used such varied types of plasticizers as the alkyl phthalates, alkoxy alkyl phthalates, alkylated toluene sulfonamides, castor oil, sulfonated castor oil, and aromatic phosphates. It is interesting to note that, although sulfonated castor oil is water-soluble, and is not ordinarily used as a plasticizer, in the present composition it serves as an excellent plasticizer, the composition remaining unaffected by water. For economic reasons, we prefer to use dibutyl phthalate, castor oil or sulfonted castor oil as the plasticizer in our compositions.

On a solvent-free basis, the "solids" in our composition may be varied within the following approximate limits:

| | |
|---|---|
| Cellulose ether | 50-80 |
| Acrylate polymer or co-polymer | 10-25 |
| Plasticizer | 5-25 |

We prefer the following approximate composition:

| | |
|---|---|
| Ethyl cellulose | 65-80 |
| Acrylate polymer or co-polymer | 12-20 |
| Dibutyl phthalate | 7-15 |

Our herein-described coating compositions are applied in the form of a solution of the above "solids" in a common solvent therefor. The composition may be applied to and spread on, for example, a 48 x 60 weave cloth, measuring 6¼ square yards per pound. The amount of coating required to give the desired adhesion characteristics is about 2 to 4 ounces, on the dry, or solvent-free basis, per square yard of goods.

After the interliner fabric has been coated and dried, it is sewn between two pieces of cloth of which the multiply article is to be made, and the layers are bonded together by the application of heat and pressure. Suitable conditions for this step are 10-20 seconds heating at 280-320 F., under a pressure of 50-80 pounds per square inch. After one such treatment, the multiply fabric is turned over and the heat and pressure treatment repeated. After the multiply fabric has been sealed in this manner, the bond strength is very high, a pull of up to 15 or more inch pounds sometimes being required to separate the outer layers of cloth from the interliner.

To determine the relative effectiveness of various adhesive compositions for use in composite articles of the type herein described, the following tests are employed.

1. Laundering test. The coated interliner is fused between broadcloth, as previously described, and strips are cut from the larger piece, for testing purposes. Some of the strips are tested for original bond strength, with or without ironing, while others are laundered by boiling them vigorously in a 5 per cent soap (Rinso) solution for 30 minutes. This is a more stringent test than boiling with 10 per cent sodium carbonate solution, and is the approximate equivalent, in its effect, of 10 or more commercial launderings. The strips are rinsed, dried, and examined for discoloration and "blistering" (non-adherent areas), and finally are tested for remaining bond strength, both before and after ironing.

2. Determination of bond strength. The multiply fabric is cut into strips about ½" x 5" in size. One of the outer layers is torn away from the interliner sufficiently to permit both layers to be gripped firmly in the jaws of a Scott tensil testing machine. A steady pull is applied and the force required to separate an outer ply from the interliner is determined. It does not appear that any particular value of bond strength may be set as a standard, below which an article is unsatisfactory, provided there is true adhesion of the plies through a series of launderings. Except in the laundering operation there is little, if any, strain on the multiply fabric, and a uniform, permanent bond having a strength of 0.5-0.75 inch pound (225-350 inch grams) is probably satisfactory, other requisites having been met. A bond strength of from 1 to 3 inch pounds is certainly sufficient for the purpose.

The following examples and tables illustrate certain of our preferred compositions and give the test data thereon:

*Example 1*

85 pounds of "standard" ethyl cellulose was dissolved in a mixture of 68 pounds of 95 per cent denatured ethanol and 272 pounds of toluene. To the solution was added 85 pounds of a 20 per cent solution of a co-polymer of ethyl methacrylate and methyl acrylate (2 moles of the former for each mole of the latter) in ethylene chloride, and 8.5 pounds of dibutyl phthalate. The so-formed mixture contained 21.3 per cent "solids" and 78.7 per cent solvent. The solids analysis is:

| | Per cent |
|---|---|
| Ethyl cellulose | 76.9 |
| Acrylate—methacrylate co-polymer | 15.4 |
| Dibutyl phthalate | 7.7 |

The solvent consisted of

| | Per cent |
|---|---|
| Toluene | 66⅔ |
| Ethanol, 95 per cent | 16⅔ |
| Ethylene chloride | 16⅔ |

The above composition was applied on a regular collar interliner, which was then made into collars and subjected to the previously described tests. The collars retained their original appearance after 20 commercial launderings. The test data are given in the table, following the examples.

Example 2

75 grams of ethyl cellulose was dissolved in 300 milliliters of a mixture of 70 parts toluene, 20 parts ethanol and 10 parts methanol, by volume. There was added 7.5 grams of dibutyl phthalate, 15 grams of the ethyl methacrylate-methyl acrylate co-polymer employed in the previous example, dissolved in 60 grams of ethylene chloride, and 7.5 grams of polymeric vinyl acetate.

The analysis of the final composition, in per cent by weight, is:

| Solids (25.1 per cent) | | Solvent (74.9 per cent) | |
|---|---|---|---|
| Ethyl cellulose | 71.5 | Toluene | 58 |
| Acrylates | 14.3 | Ethanol | 15.1 |
| Vinyl acetate | 7.1 | Methanol | 7.6 |
| Dibutyl phthalate | 7.1 | Ethylene chloride | 19.3 |

This composition was applied and tested as in Example 1, and the test data are given in the table.

Example 3

A composition was prepared, identical with that of Example 2, except that 3.5 grams of polymeric vinyl acetate and 3.5 grams of polymeric isobutyl methacrylate were substituted for the 7.5 grams of vinyl acetate of that example. The test data are found in the table.

Example 4

75 grams of standard ethyl cellulose, 75 grams of a 20 per cent solution, by weight, of the ethyl methacrylate-methyl acrylate co-polymer employed in the previous examples, and 30 grams of sulfonated castor oil were dissolved in 300 milliliters of a mixture of 80 parts of toluene and 20 parts of ethanol, by volume. The analysis of the final composition is:

| Solids (27.6 per cent) | | Solvent (72.4 per cent) | |
|---|---|---|---|
| Ethyl cellulose | 62.5 | Toluene | 65.9 |
| Acrylates | 12.5 | Ethanol | 15.05 |
| Sulfonated castor oil | 25.0 | Ethylene chloride | 19.05 |

This composition was comparable with those of the preceding examples, when used as an adhesive in collar interliners.

Example 5

50 grams of standard ethyl cellulose, 5 grams of dibutyl phthalate, and 50 grams of a 20 per cent solution of polymethyl acrylate in ethyl acetate, were dissolved in 200 milliliters of an 80:20 mixture by volume of toluene and ethanol. Composition:

| Solids (23.5 per cent) | | Solvent (76.5 per cent) | |
|---|---|---|---|
| Ethyl cellulose | 77 | Toluene | 65.9 |
| Methyl acrylate polymer | 15.3 | Ethanol | 15.05 |
| Dibutyl phthalate | 7.7 | Ethyl acetate | 19.05 |

Example 6

To the composition of Example 5 was added 5 grams of polymerized vinyl acetate. The so-formed adhesive was satisfactory for use in fabricating multiply fabric articles.

Example 7

To the composition of Example 5 was added 2.5 grams of a vinyl acetate polymer and 2.5 grams of an isobutyl methacrylate polymer. The product was similar in its adhesive properties to those of Examples 1–4, inclusive.

The following table gives the test results on collars and similar articles in which some of the foregoing adhesive compositions were employed. The samples were rated for strength, appearance, and launderability by a shirt manufacturer, and were all better than samples cut from commercially procurable multiply collars. All samples are tested in duplicate, the individual pieces being cut from non-contiguous portions of the multiply sheet.

Table

| Example No. | Coating rate pounds/ square yard | Bond strength | |
|---|---|---|---|
| | | Original value, inch grams | After 30 minute boiling in 5% soap solution, inch grams |
| 1 | 0.21 | 2120–1890 | 460–620 |
| 2 | 0.18 | 1450–1500 | 500–800 |
| 3 | 0.18 | 1640–1000 | 460–500 |
| 4 | 0.18 | 1360–900 | 700–460 |
| 5 | 0.23 | 900–780 | 340–400 |
| 6 | 0.21 | 1120–1020 | 400–400 |
| 7 | 0.22 | 880–880 | 400–420 |

Our tests have shown that the bond strength is reduced by about one-half to two-thirds by the first 30 minute boiling in 5 per cent soap solution. After the first boiling (approximately 10 commercial launderings) the bond strength remains fairly constant. The appearance and bond of a coating that withstands the first boiling is retained through succeeding washing and ironing cycles. The bond strength, which is reduced by the first washing, is improved somewhat by ironing.

The invention has been illustrated with respect to ethyl cellulose compositions comprising an acrylate polymer or co-polymer and a plasticizer. Other cellulose ethers, and particularly the lower alkyl ethers, may be employed in preparing similar compositions.

Single or mixed plasticizers may be used, and the properties of the composition may be modified, if desired, by the addition of resins or waxes, provided these materials have the required alkali-resistance when incorporated in the composition. Some resins and waxes have the property of lowering the viscosity of cellulose ether compositions, thus making possible the preparation of coating solutions of high solids content relative to the viscosity, while still employing from medium to high viscosity type cellulose ethers to take advantage of their greater flexibility and tensile strength.

The compositions employed in preparing the herein-described collar interliners are described and claimed in our co-pending application Serial No. 208,836, filed May 19, 1938.

Other modes of applying the principle of our invention may be employed instead of those explained, change being made as regards the materials employed, provided the ingredients stated by any of the following claims or the equivalent of such stated ingredients be employed.

We therefore particularly point out and distinctly claim as our invention:

1. A multiply fabric article characterized by its resistance to discoloration and to separation of the plies during laundering containing as an adhesive interliner a fabric coated with a thermoplastic composition, stable under laundering conditions, comprising between about 50 and about 80 per cent by weight of a lower alkyl ether of cellulose, between about 10 and about 25 per cent of a polymeric material selected from the group consisting of the lower alkyl esters of acrylic acid and their mixed polymers with the lower alkyl esters of methacrylic acid, said acrylic acid ester component of such mixed polymers being in sufficient amount to render the same compatible with the recited cellulose ether in the proportion specified, and between about 5 and about 25 per cent of a plasticizer.

2. An article as in claim 1, wherein the cellulose ther is ethyl cellulose having an ethoxyl content of between about 45 and about 50 per cent, and a viscosity of between about 50 and about 200 centipoises as determined at 25° C. in a 5 per cent solution thereof, by weight, in a mixture of 80 parts of toluene and 20 parts of ethanol, by volume.

3. A multiply fabric article characterized by its resistance to discoloration and to separation of the plies during laundering, containing as an adhesive interliner a fabric coated with a thermoplastic composition, stable under laundering conditions, comprising between about 65 and about 80 per cent by weight of ethyl cellulose having an ethoxyl content of between about 45 and about 50 per cent, and a viscosity of between about 50 and about 200 centipoises as determined at 25° C. in a 5 per cent solution thereof, by weight, in a mixture of 80 parts of toluene and 20 parts of ethanol, by volume, between about 12 and about 20 per cent of a polymeric material selected from the group consisting of the lower alkyl esters of acrylic acid and their mixed polymers with the lower alkyl esters of methacrylic acid, said acrylic acid ester component of such mixed polymers being in sufficient amount to render the same compatible with the recited cellulose ether in the proportion specified, and between about 7 and about 15 per cent of a plasticizer.

4. A laminated collar characterized by its resistance to discoloration and to separation of the plies during laundering, containing as an adhesive interliner a fabric coated with from 2 to 3 ounces per square yard of a thermoplastic composition, stable under laundering conditions, comprising between about 65 and about 80 per cent by weight, of ethyl cellulose having an ethoxyl content of between about 45 and about 50 per cent, and a viscosity of between about 50 and about 200 centipoises as determined at 25° C. in a 5 per cent solution thereof, by weight, in a mixture of 80 parts of toluene and 20 parts of ethanol, by volume, between about 12 and about 20 per cent of a polymeric material selected from the group consisting of the lower alkyl esters of acrylic acid and their mixed polymers with the lower alkyl esters of methacrylic acid, said acrylic acid ester component of such mixed polymers being in sufficient amount to render the same compatible with the recited cellulose ether in the proportion specified, and between about 7 and 15 per cent of a plasticizer.

TOIVO A. KAUPPI.
RUSSELL R. BRADSHAW.